US008378035B2

(12) United States Patent
Kawaguchi et al.

(10) Patent No.: US 8,378,035 B2
(45) **Date of Patent: *Feb. 19, 2013**

(54) THERMOPLASTIC ELASTOMER COMPOSITION

(75) Inventors: Koichi Kawaguchi, Hiratsuka (JP); Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 327 days.

This patent is subject to a terminal disclaimer.

(21) Appl. No.: 12/848,561

(22) Filed: Aug. 2, 2010

(65) Prior Publication Data

US 2011/0028651 A1 Feb. 3, 2011

(30) Foreign Application Priority Data

Aug. 3, 2009 (JP) ................................ 2009-180800

(51) Int. Cl.
*C08C 19/20* (2006.01)
*C08C 19/22* (2006.01)

(52) U.S. Cl. .................. 525/351; 525/327.5; 525/330.4; 525/329.8; 525/331.8; 525/333.9; 525/343; 525/329.9; 525/332.7; 152/510; 152/203

(58) Field of Classification Search ............... 525/327.5, 525/329.8, 330.4, 331.8, 332.6, 333.9, 343, 525/351, 329.9, 332.7; 152/510, 203
See application file for complete search history.

(56) References Cited

U.S. PATENT DOCUMENTS 4,433,114 A * 2/1984 Coran et al. ............... 525/332.6
5,910,544 A 6/1999 Ozawa et al.
6,079,465 A 6/2000 Takeyama et al.
2011/0028648 A1* 2/2011 Kawaguchi et al. ............ 525/58

FOREIGN PATENT DOCUMENTS

JP 8-259741 A 10/1996
JP 10-25375 A 1/1998
JP 10-114840 A 5/1998
JP 2000-160024 A 6/2000

* cited by examiner

*Primary Examiner* — Mark Kaucher
(74) *Attorney, Agent, or Firm* — Connolly Bove Lodge & Hutz LLP

(57) ABSTRACT

An object of the present invention is, in a thermoplastic elastomer composition in which a modified rubber is filled and dispersed in a polyamide resin matrix in order to improve the low-temperature durability of the polyamide resin, to reduce the extrusion load during extrusion molding thereof into a film without deteriorating the low-temperature durability. The present invention is a thermoplastic elastomer composition (E) comprising a modified polyamide resin (C) and a modified rubber (D) dispersed in the modified polyamide resin (C), the modified polyamide resin (C) being a resin obtained by melt-blending an polyamide resin (A) and a compound (B) capable of reacting with a terminal amino group of a polyamide resin, wherein the modified rubber (D) has an acid anhydride group or epoxy group and is dynamically cross-linked by a compound (F) having at least one disulfide bond and at least two amino groups. This thermoplastic elastomer composition can be suitably used in the production of an inner liner of a pneumatic tire.

13 Claims, No Drawings

THERMOPLASTIC ELASTOMER COMPOSITION

CROSS REFERENCE TO RELATED APPLICATIONS

This application claims priority under 35 U.S.C. §119(a) on Patent Application No(s). 2009180800 filed in Japan on Aug. 3, 2009, the entire contents of which are hereby incorporated by reference.

TECHNICAL FIELD

The present invention relates to a thermoplastic elastomer composition comprising a polyamide resin and modified rubber. Particularly, the present invention relates to a thermoplastic elastomer composition in which modified rubber is dispersed in the polyamide resin matrix, having a small extrusion load during extrusion molding thereof into a film.

BACKGROUND ART

A thermoplastic elastomer composition having superior balance between the gas-barrier property and flexibility, comprising a specific thermoplastic resin matrix in which a specific rubber elastomer ingredient is dispersed as a discontinuous phase is known. See Japanese Unexamined Patent Publication No. 8-259741.

Further, it is also known that, by having a melt viscosity ($\eta_m$) of the thermoplastic resin ingredient and a melt viscosity ($\eta_d$) of a rubber elastomer ingredient in the thermoplastic elastomer composition satisfy a specific relationship, a high elastomer ingredient ratio is achieved and thereby a thermoplastic elastomer composition having more flexibility and a superior gas-barrier property is obtained. There is also known a pneumatic tire using this thermoplastic elastomer composition as a gas-barrier layer. See Japanese Unexamined Patent Publication No. 10-25375.

Further, there is also known a thermoplastic elastomer composition comprising a thermoplastic elastomer having a thermoplastic resin as a matrix and a rubber composition as a dispersed phase in which a barrier resin composition having a phase structure dispersed in a flat shape is introduced so that the gas-barrier property is greatly improved and the flexibility, oil resistance, cold resistance and heat resistance are provided to the thermoplastic elastomer composition. See Japanese Unexamined Patent Publication No. 10-114840.

Further, there is also known a thermoplastic elastomer composition comprising an aliphatic polyamide resin modified by a layered silicate into which an acid anhydride-modified ethylene-based modifying polymer is blended. See Japanese Unexamined Patent Publication No. 2000-160024.

SUMMARY OF INVENTION

Technical Problem

When an ordinary polyamide resin is blended with a modified rubber having an acid anhydride group or epoxy group, the polyamide resin reacts with the acid anhydride group or epoxy group. Therefore, when a large amount of such a modified rubber is blended, there is a problem in that the fluidity during melting is drastically decreased and the film-forming property is greatly deteriorated.

An object of the present invention is, in a thermoplastic elastomer composition in which a modified rubber having excellent low-temperature durability is dispersed and filled in a polyamide resin matrix in order to improve the low-temperature durability (i.e., resistance to repeated fatigue) of the polyamide resin, to reduce the extrusion load during extrusion molding thereof into a film without deteriorating the low-temperature durability.

Solution to Problem

The present invention is a thermoplastic elastomer composition comprising a modified polyamide resin (C) and a modified rubber (D) dispersed in the modified polyamide resin (C), the modified polyamide resin (C) being a resin obtained by melt-blending a polyamide resin (A) and a compound (B) capable of reacting with a terminal amino group of a polyamide resin, wherein the modified rubber (D) has an acid anhydride group or epoxy group and is dynamically cross-linked by a compound (F) having at least one disulfide bond and at least two amino groups.

It is preferable that the modified rubber (D) is dynamically cross-linked by the compound (F) having at least one disulfide bond and at least two amino groups and a compound (G) having at least two amino groups and having no disulfide bond.

Further, the compound (B) capable of reacting with a terminal amino group of a polyamide resin is preferably a monofunctional epoxy compound.

Further, the polyamide resin (A) is preferably nylon 6 or nylon 666.

Further, a rubber constituting the modified rubber (D) is preferably an ethylene-α-olefin copolymer, or an ethylene-unsaturated carboxylic acid copolymer or a derivative thereof.

Further, the compound (F) having at least one disulfide bond and at least two amino groups is preferably diaminodiphenyl disulfide.

Further, the compound (G) having at least two amino groups and having no disulfide bond is preferably 3,3'-diaminodiphenyl sulfone.

Further, the thermoplastic elastomer composition preferably comprises 90 to 180 parts by weight of the modified rubber (D) based on 100 parts by weight of the modified polyamide resin (C).

Further, the thermoplastic elastomer composition preferably comprises 0.01 to 5 parts by weight of the compound (F) having at least one disulfide bond and at least two amino groups based on 100 parts by weight of the modified rubber (D).

Further, the total amount of the compound (F) having at least one disulfide bond and at least two amino groups and the compound (G) having at least two amino groups and having no disulfide bond is preferably 0.01 to 5 parts by weight based on 100 parts by weight of the modified rubber (D).

Further, the modified polyamide resin (C) is preferably a resin obtained by melt-blending 100 parts by weight of the polyamide resin (A) and 0.05 to 5 parts by weight of the compound (B) capable of reacting with a terminal amino group of a polyamide resin.

It is preferable that the thermoplastic elastomer composition further comprises an ethylene-vinyl alcohol copolymer (H).

The weight ratio of the modified polyamide resin (C) to the ethylene-vinyl alcohol copolymer (H) is preferably 90/10 to 10/90, and the amount of the modified rubber (D) is preferably 90 to 180 parts by weight based on 100 parts by weight of the total amount of the modified polyamide resin (C) and the ethylene-vinyl alcohol copolymer (H).

The present invention is also a pneumatic tire comprising a film composed of the aforementioned thermoplastic elastomer composition as an inner liner.

Advantageous Effects of Invention

According to the present invention, in a thermoplastic elastomer composition in which a modified rubber is dispersed in a modified polyamide resin, by dynamically cross-linking the modified rubber by a compound having at least one disulfide bond and at least two amino groups, the extrusion load during extrusion molding of the thermoplastic elastomer composition into a film can be reduced without deteriorating the low-temperature durability.

DESCRIPTION OF EMBODIMENTS

The thermoplastic elastomer composition (E) according to the present invention comprises a modified polyamide resin (C) and a modified rubber (D) having an acid anhydride group or epoxy group.

The modified polyamide resin (C) used in the present invention is a resin obtained by melt-blending a polyamide resin (A) and a compound (B) capable of reacting with a terminal amino group of a polyamide resin.

Examples of the polyamide resin (A) includes, but is not limited to, nylon 11, nylon 12, nylon 6, nylon 66, nylon 666, nylon 612, nylon 610, nylon 46, nylon 66612, and an aromatic nylon, and mixtures thereof. The polyamide resin (A) is preferably nylon 6 or nylon 666 from the standpoint of attaining both fatigue resistance and gas-barrier properties.

Examples of the compound (B) capable of reacting with a terminal amino group of a polyamide resin include an isocyanate-containing compound, acid anhydride group-containing compound and halogenated alkyl group-containing compound. A compound (B) is preferably a monofunctional epoxy compound from the standpoint of the reactivity with a terminal amino group of a polyamide resin.

Examples of the monofunctional epoxy compound include ethylene oxide, epoxypropane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecane, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether and p-sec-butyl phenyl glycidyl ether. From the standpoint of compatibility with the polyamide resin, an epoxy compound having 3 to 20, preferably 3 to 13 carbon atoms and having an ether and/or hydroxy group is particularly preferable.

A method for melt-blending the polyamide resin (A) and the compound (B) capable of reacting with a terminal amino group of a polyamide resin is not particularly restricted. For example, the polyamide resin (A) and the compound (B) capable of reacting with a terminal amino group of a polyamide resin are fed into a biaxial kneader and melt-blended at a temperature not lower than the melting point of the polyamide resin (A), preferably at a temperature not less than 20° C. higher than the melting point of the polyamide resin (A), for example, at 240° C. The duration of the melt-blending is, for example, 1 to 10 minutes, and preferably 2 to 5 minutes.

In cases where a monofunctional epoxy compound represented by the following formula (1):

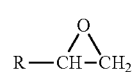

(1)

is melt-blended as the compound (B) capable of reacting with a terminal amino group of a polyamide resin, the monofunctional epoxy compound bonds to a terminal amino group of the polyamide resin (C), and the terminal amino group is modified, for example, as in the following.

(2)

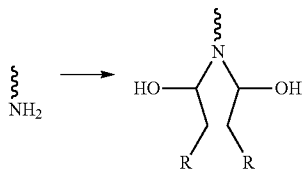

Since a part of or all of the terminal amino groups of the polyamide resin (A) changes to another group as a result of the reaction, the extrusion load during the extrusion molding into a film can be reduced while maintaining the fluidity, even if a large amount of the modified rubber (D) having an acid anhydride group or epoxy group is added.

The amount of the compound (B) capable of reacting with a terminal amino group of a polyamide resin used in the modification of the polyamide resin (A) is, based on 100 parts by weight of the polyamide resin (A), 0.05 to 5 parts by weight and preferably 1 to 3 parts by weight. When the amount of the compound (B) capable of reacting with a terminal amino group of a polyamide resin is too small, the effect of reducing the extrusion load during extrusion molding into a film is too small. On the other hand, when the amount of the compound (B) is too large, the low-temperature durability of the polyamide resin is deteriorated.

The modified rubber (D) used in the present invention has an acid anhydride group or epoxy group. From the standpoint of compatibility with the polyamide resin, it is preferable that the modified rubber (D) has an acid anhydride group.

A rubber constituting the modified rubber (D) is preferably an ethylene-α-olefin copolymer, or an ethylene-unsaturated carboxylic acid copolymer or a derivative thereof. Examples of the ethylene-α-olefin copolymer include ethylene-propylene copolymer, ethylene-butene copolymer, ethylene-hexene copolymer and ethylene-octene copolymer. Examples of the ethylene-unsaturated carboxylic acid copolymer or a derivative thereof include an ethylene-acrylic acid copolymer, ethylene-methacrylic acid copolymer, ethylene-methyl acrylate copolymer and ethylene-methyl methacrylate copolymer.

The modified rubber having an acid anhydride group can be produced, for example, by allowing an acid anhydride and peroxide to react with rubber. Further, such modified rubber having an acid anhydride group is commercially available, and a commercially available product can be used. Examples of the commercially available product include a maleic anhydride-modified ethylene-propylene copolymer TAFMER® MP0620 and a maleic anhydride-modified ethylene-butene copolymer TAFMER® MP7020, which are manufactured by Mitsui Chemicals, Inc.

The modified rubber having an epoxy group can be produced by, for example, by copolymerizing glycidyl methacrylate with rubber. Further, such modified rubber having an epoxy group is commercially available, and a commercially available product can be used. Examples of the commercially available product include an epoxy-modified ethylene-methyl acrylate copolymer BONDINE® (Lotader MAH) LX4110, TX8030 and AX8390 manufactured by ARKEMA Inc., BONDFAST 2C, E, 2B, 7B and 7L, and ESPLENE® EMA2752 manufactured by Sumitomo Chemical Co., Ltd., and Epofriend AT501 and CT301 manufactured by Daicel Chemical Industries, Ltd.

A particularly preferable modified rubber (D) is an ethylene-α-olefin copolymer graft-modified with an acid anhydride group, and examples thereof include the aforementioned maleic anhydride-modified ethylene-propylene copolymer TAFMER® MP0620 manufactured by Mitsui Chemicals, Inc.

The ratio of the modified polyamide resin (C) and the modified rubber (D) in the thermoplastic elastomer composition is preferably 90 to 180 parts by weight, and more preferably 95 to 160 parts by weight of the modified rubber (D), with respect to 100 parts by weight of the modified polyamide resin (C). When the ratio of the modified rubber (D) is too small, the low-temperature durability of the thermoplastic elastomer composition is inferior. However, when the ratio is too large, the extrusion load during extrusion molding of the thermoplastic elastomer composition into a film is increased. In the thermoplastic elastomer composition of the present invention, the modified polyamide resin (C) forms a continuous phase and the modified rubber (D) forms a dispersed phase.

In the thermoplastic elastomer composition of the present invention, the modified rubber (D) is dynamically cross-linked by the compound (F) having at least one disulfide bond and at least two amino groups. By this dynamic cross-linking, the dispersed condition of the modified rubber (D) in the thermoplastic elastomer composition can be fixed. The dynamic cross-linking of the modified rubber (D) by the compound (F) having at least one disulfide bond and at least two amino groups enables a reduction in the extrusion load during extrusion molding of the thermoplastic elastomer composition into a film without deteriorating the low-temperature durability thereof. It is more preferable to dynamically cross-link the modified rubber (D) by the compound (F) having at least one disulfide bond and at least two amino groups, as well as by the compound (G) having at least two amino groups and having no disulfide bond, since the low-temperature durability can be improved while reducing the extrusion load during extrusion molding of the thermoplastic elastomer composition into a film.

The dynamic cross-linking can be carried out by melt-blending the modified rubber (D) with the compound (F), or the compound (F) and the compound (G). The temperature of the melt-blending is usually not lower than the melting point of the modified polyamide resin, and it is preferably 20° C. higher than the melting point of the modified polyamide resin, for example, 190 to 290° C. For example, in cases where a nylon whose melting point is 225° C. is used, the temperature of the melt-blending is preferably 245 to 265° C. The duration of the melt-blending is usually 1 to 10 minutes, and preferably 2 to 5 minutes. The shear rate during kneading is preferably 1,000 to 8,000 $sec^{-1}$, and more preferably 1,000 to 5,000 $sec^{-1}$.

Examples of the compound (F) having at least one disulfide bond and at least two amino groups include a diaminodiphenyl disulfide and diamino-dimethyldiphenyl disulfide. A preferable compound (F) is a diaminodiphenyl disulfide. Examples of diaminodiphenyl disulfide include 2,2'-diaminodiphenyl disulfide, 2,3'-diaminodiphenyl disulfide, 2,4'-diaminodiphenyl disulfide, 3,3'-diaminodiphenyl disulfide, 3,4'-diaminodiphenyl disulfide and 4,4'-diaminodiphenyl disulfide. A preferable dithiodianiline is 2,2'-diaminodiphenyl disulfide. 2,2'-Diaminodiphenyl disulfide is a compound represented by the following chemical structural formula:

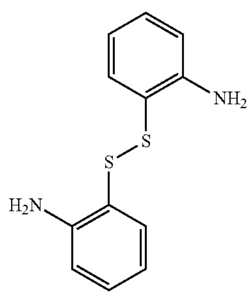 [SMILES: Nc1ccccc1SSc1ccccc1N]

Examples of the compound (G) having at least two amino groups and having no disulfide bond include a diaminodiphenyl sulfone, hexamethylenediamine, triethylenetetramine, tetraethylenepentamine, methylenediamine carbamate and N,N'-dicinnamylidene-1,6-hexadiamine. A compound (G) is preferably diaminodiphenyl sulfone. Examples of diaminodiphenyl sulfone include 2,2'-diaminodiphenyl sulfone, 2,3'-diaminodiphenyl sulfone, 2,4'-diaminodiphenyl sulfone, 3,3'-diaminodiphenyl sulfone, 3,4'-diaminodiphenyl sulfone and 4,4'-diaminodiphenyl sulfone. A preferable diaminodiphenyl sulfone is 3,3'-diaminodiphenyl sulfone. 3,3'-Diaminodiphenyl sulfone is a compound represented by the following chemical structural formula:

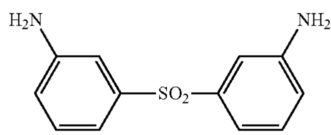

The amount of the compound (F) is, based on 100 parts by weight of the modified rubber (D), preferably 0.01 to 5 parts by weight, more preferably 0.5 to 2.5 parts by weight, and still more preferably 0.5 to 1.5 parts by weight. When the amount of compound (F) is too small, the dynamic cross-linking is not sufficient and fine dispersion of the modified rubber (D) cannot be maintained, so that the extrusion load during extrusion molding of the thermoplastic elastomer composition into a film is increased. On the other hand, when the amount is too large, the low-temperature durability is reduced.

In cases where the compound (G) is used in combination, the total amount of the compound (F) and the compound (G) is, based on 100 parts by weight of the modified rubber (D), preferably 0.01 to 5 parts by weight, more preferably 0.1 to 3.0 parts by weight, and still more preferably 0.6 to 2.4 parts by weight. When the total amount of the compound (F) and the compound (G) is too small, the dynamic cross-linking is not sufficient and fine dispersion of the modified rubber (D) cannot be maintained, so that the extrusion load during extrusion molding of the thermoplastic elastomer composition into a film is increased. On the other hand, when the amount is too large, the low-temperature durability is reduced.

In cases where the compound (G) is used in combination, the ratio of the compound (G) is, based on the total amount of the compound (F) and the compound (G), preferably 10 to 80% by weight, and more preferably 30 to 50% by weight. With the ratio of the compound (G) in this range, the low-temperature durability can be improved while reducing the extrusion load during extrusion molding of the thermoplastic elastomer composition into a film.

It is preferable that the thermoplastic elastomer composition of the present invention further comprises an ethylene-vinyl alcohol copolymer (H). By blending the ethylene-vinyl alcohol copolymer, the gas-barrier properties of the thermoplastic elastomer composition can be improved. The ethylene-vinyl alcohol copolymer is a copolymer comprising ethylene unit (—$CH_2CH_2$—) and vinyl alcohol unit (—$CH_2$—CH(OH)—); however, it may also contain another constituent unit in addition to the ethylene unit and vinyl alcohol unit to such an extent that the effects of the present invention are not inhibited. The ethylene-vinyl alcohol copolymer used in the present invention contains the ethylene unit preferably at an amount of 20 to 50 mol %, and more preferably in an amount of 20 to 40 mol %. When the ethylene unit content in the ethylene-vinyl alcohol copolymer is less than 20 mol %, the ethylene-vinyl alcohol copolymer is likely to thermally decompose, while the gas-barrier properties of the ethylene-vinyl alcohol copolymer are deteriorated when the ethylene unit content is more than 50 mol %. The ethylene-vinyl alcohol copolymer is a saponification product of ethylene-vinyl acetate copolymer, and the saponification degree thereof is not particularly restricted; however, it is preferably not less than 90%, and more preferably not less than 99%. When the saponification degree of the ethylene-vinyl alcohol copolymer is too small, the gas-barrier properties of the ethylene-vinyl alcohol copolymer are deteriorated. Such ethylene-vinyl alcohol copolymer is commercially available and can be obtained for example under the trade names SOANOL® such as SOANOL® A4415 from Nippon Synthetic Chemical Industry Co., Ltd. and under the trade name of EVAL® from Kuraray Co., Ltd. Examples of the ethylene-vinyl alcohol copolymer whose ethylene unit content is 20 to 50 mol % include SOANOL® V2504RB (ethylene unit content: 25 mol %) manufactured by Nippon Synthetic Chemical Industry Co., Ltd. and EVAL® G156B manufactured by Kuraray Co., Ltd.

In cases where the thermoplastic elastomer composition of the present invention contains the ethylene-vinyl alcohol copolymer (H), the weight ratio of the modified polyamide resin (C) and the ethylene-vinyl alcohol copolymer (H) is preferably 90/10 to 10/90, and more preferably 80/20 to 20/80. When the amount of the ethylene-vinyl alcohol copolymer (H) is small, the gas-barrier properties are hardly improved, while when the amount is large, the low-temperature durability is drastically deteriorated.

In cases where the thermoplastic elastomer composition of the present invention contains the ethylene-vinyl alcohol copolymer (H), the amount of the modified rubber (D) is, based on 100 parts by weight of the total amount of the modified polyamide resin (C) and the ethylene-vinyl alcohol copolymer (H), preferably 90 to 180 parts by weight, and more preferably 95 to 160 parts by weight. When the amount of the modified rubber (D) is too small, the low-temperature durability of the thermoplastic elastomer composition is inferior, while when the amount is too large, the extrusion load during extrusion molding of the thermoplastic elastomer composition into a film is increased.

The thermoplastic elastomer composition of the present invention can be produced by melt-blending the modified polyamide resin (C), the modified rubber (D), the compound (F) having at least one disulfide bond and at least two amino groups, and if desired, the compound (G) having at least two amino groups and having no disulfide bond and the ethylene-vinyl alcohol copolymer (H).

Further, the thermoplastic elastomer composition of the present invention can also be produced by melt-blending the polyamide resin (A), the compound (B) capable of reacting with a terminal amino group of a polyamide resin, the modified rubber (D), the compound (F) having at least one disulfide bond and at least two amino groups, and if desired, the compound (G) having at least two amino groups and having no disulfide bond and the ethylene-vinyl alcohol copolymer (H).

The compound (B) capable of reacting with a terminal amino group of a polyamide resin may be added simultaneously to the melt-blending of the polyamide resin (A), the compound (B) and the modified rubber (D); however, it is preferable to melt-blend the polyamide resin (A) and the compound (B) to prepare the modified polyamide resin (C) in advance, followed by addition of the modified rubber (D) to the thus prepared modified polyamide resin (C) for melt-blending.

The timing of adding the compound (F) having at least one disulfide bond and at least two amino groups (in cases where the compound (G) having at least two amino groups and having no disulfide bond is used in combination, the compound (F) and the compound (G)) may be at the same time as the melt-blending of the modified polyamide resin (C) and the modified rubber (D), or after the melt-blending of the modified polyamide resin (C) and the modified rubber (D). That is, the modified polyamide resin (C), modified rubber (D), as well as the compound (F), or the compound (F) and the compound (G), may be simultaneously melt-blended, or the modified polyamide resin (C) and the modified rubber (D) are melt-blended and once the modified rubber (D) is sufficiently dispersed, the compound (F), or the compound (F) and the compound (G), can be added for further melt-blending. Preferably, the modified polyamide resin (C) and the modified rubber (D) are melt-blended and once the modified rubber (D) is sufficiently dispersed, the compound (F), or the compound (F) and the compound (G), can be added for further melt-blending.

The temperature of the melt-blending is not lower than the melting point of the modified polyamide resin, and it is preferably 20° C. higher than the melting point of the modified polyamide resin, for example, 220 to 250° C. The duration of the melt-blending is usually 1 to 10 minutes, and preferably 2 to 5 minutes.

In cases where the thermoplastic elastomer composition of the present invention contains the ethylene-vinyl alcohol copolymer (H), it is preferable that the ethylene-vinyl alcohol copolymer (H) be blended simultaneously with the polyamide resin (A) or the modified polyamide resin (C).

As for adding a plasticizer, the timing thereof is not particularly restricted; however, it is preferable that the plasticizer is added to and kneaded with the polyamide resin (A) or the modified polyamide resin (C) in advance.

A typical method of producing the thermoplastic elastomer composition of the present invention is, for example, one in the following.

First, the polyamide resin (A), the compound (B) capable of reacting with a terminal amino group of a polyamide resin and the plasticizer are kneaded for 1 to 10 minutes in a biaxial kneader whose temperature is set at 220 to 250° C. to prepare the modified polyamide resin (C). Next, the thus prepared modified polyamide resin (C) and the modified rubber (D) are fed into the biaxial kneader whose temperature is set at 220 to 250° C. and once the modified rubber (D) is dispersed, the compound (F) having at least one disulfide bond and at least two amino groups (in cases where the compound (G) having at least two amino groups and having no disulfide bond is used in combination, the compound (F) and the compound (G)) is/are fed to dynamically cross-link the modified rubber (D). Lastly, other compounding agents are added.

In cases where the thermoplastic elastomer composition of the present invention contains the ethylene-vinyl alcohol copolymer (H), for example, the polyamide resin (A), the compound (B) capable of reacting with a terminal amino group of a polyamide resin and the plasticizer are kneaded for 1 to 10 minutes in a biaxial kneader whose temperature is set at 220 to 250° C. to prepare the modified polyamide resin (C). Subsequently, the thus prepared modified polyamide resin (C), the ethylene-vinyl alcohol copolymer (H) and the modified rubber (D) are fed into the biaxial kneader whose temperature is set at 220 to 250° C. and once the modified rubber (D) is dispersed, the compound (F) having at least one disulfide bond and at least two amino groups (in cases where the compound (G) having at least two amino groups and having no disulfide bond is used in combination, the compound (F) and the compound (G)) is/are fed to dynamically cross-link the modified rubber (D). Lastly, other compounding agents are added.

In addition to the aforementioned components, various additives that are commonly blended in a rubber composition, for example, other reinforcing agent (filler), such as carbon black or silica, a vulcanizing or cross-linking agent, a vulcanizing or cross-linking promoter, a plasticizer, various oils and an anti-oxidant may be blended in the thermoplastic elastomer composition of the present invention. The amount of these additives may be a conventionally ordinary amount, as long as it serves the object of the present invention.

The thermoplastic elastomer composition of the present invention can be made into a film by an extruder equipped with a T-die, inflation molding machine or the like.

The pneumatic tire of the present invention is a pneumatic tire in which a film comprising the aforementioned thermoplastic elastomer composition is used as an inner liner. As the method of producing the tire, a commonly used method can be employed. For example, the thermoplastic elastomer composition of the present invention is extruded into the form of a film having a prescribed width and thickness, which is then laminated cylindrically onto a tire forming drum. Members commonly used in the production of a tire such as a carcass layer, belt layer and tread layer, which comprise non-vulcanized rubber, are sequentially laminated thereon, and the drum is removed to obtain a green tire. Thereafter, by thermally vulcanizing this green tire in accordance with a conventional method, a desired pneumatic tire can be produced.

The thermoplastic elastomer composition of the present invention can also be used in the production of a hose. As the method of producing a hose using the thermoplastic elastomer composition of the present invention, a commonly used method can be employed. For example, a hose can be produced as in the following. First, using a pellet of the thermoplastic elastomer composition of the present invention, on a mandrel onto which a releaser has been applied in advance, the thermoplastic elastomer composition is extruded by a cross-head extrusion method using a resin extruder to form an inner pipe. Another thermoplastic elastomer composition of the present invention or a common thermoplastic rubber composition may be further extruded onto the inner pipe to form an outer layer of the inner pipe. Next, as necessary, an adhesive is applied by brushing spraying, etc., onto the inner pipe. Further, using a braider, reinforcing yarns or reinforcing steel wires are braided onto the inner pipe. After applying, as necessary, an adhesive to adhere the inner pipe with an outer pipe onto the thus formed reinforcing layer, the thermoplastic elastomer composition of the present invention or other common thermoplastic rubber composition is extruded by a cross-head resin extruder in the same manner to form the outer pipe. Finally, by removing the mandrel, a hose can be obtained. Examples of the adhesive applied onto the inner pipe or reinforcing layer include those of isocyanate-based, urethane-based, phenol resin-based, resorcin-based, chlorinated rubber-based and HRH-based, and particularly preferable are an isocyanate-based adhesive and urethane-based adhesive.

EXAMPLES (1) Raw Materials

As the polyamide resin (A), nylon 6 ("UBE Nylon" 1022B manufactured by Ube Industries, Ltd.) was used.

As the compound (B) capable of reacting with a terminal amino group of a polyamide resin, p-sec-butylphenyl glycidyl ether (Epiol® SB manufactured by NOF Corporation) was used.

As the modified rubber (D), maleic anhydride-modified ethylene-propylene copolymer (TAFMER® MP0620 manufactured by Mitsui Chemicals, Inc.; hereinafter, also referred to as "Mah-EP") and epoxy-modified ethylene-methyl acrylate copolymer (BONDINE® (Lotader MAH) TX8030 manufactured by ARKEMA Inc.) were used.

As the compound (F) having at least one disulfide bond and at least two amino groups, 2,2'-diaminodiphenyl disulfide (D1246 manufactured by Tokyo Chemical Industry Co., Ltd.) was used.

As the compound (G) having at least two amino groups and having no disulfide bond, 3,3'-diaminodiphenyl sulfone (3,3'-DAS manufactured by Mitsui Fine Chemical, Inc.) were used.

As the ethylene-vinyl alcohol copolymer (H), SOANOL® A4415 manufactured by Nippon Synthetic Chemical Industry Co., Ltd. was used.

As the plasticizer, n-butylbenzenesulfonamide (BM-4 manufactured by Daihachi Chemical Industry Co., Ltd.) was used.

(2) Preparation of Thermoplastic Elastomer Compositions

The nylon 6, p-sec-butyl phenyl glycidyl ether and n-butylbenzene sulfonamide were fed to a biaxial kneader (TEX44 manufactured by The Japan Steel Works, Ltd.) at the weight ratio shown in Table 1 and melt-blended at a kneader temperature of 230° C. to prepare the modified polyamide resin.

TABLE 1

| | | Modified polyamide resin |
|---|---|---|
| Nylon 6 | parts by weight | 100 |
| p-sec-butylphenyl glycidyl ether | parts by weight | 2 |
| n-butylbenzenesulfonamide | parts by weight | 10 |
| Total | parts by weight | 112 |

Fed into the biaxial kneader were 81.3 parts by weight of the modified polyamide resin prepared in the above manner and 100.0 parts by weight of the maleic anhydride-modified ethylene-propylene copolymer or epoxy-modified ethylene-methyl acrylate copolymer, which were melt-blended at a kneader temperature of 220° C. Once the maleic anhydride-modified ethylene-propylene copolymer or epoxy-modified ethylene-methyl acrylate copolymer was dispersed, 2,2'-diaminodiphenyl disulfide, or 2,2'-diaminodiphenyl disulfide and 3,3'-diaminodiphenyl sulfone, was/were fed at an amount shown in Tables 2 and 3 and melt-blended. The thus melt-blended mixtures were then extruded from the extruder in the form of strands, which were cooled with water and cut by a cutter to obtain thermoplastic elastomer compositions in the form of a pellet.

Further, fed into the biaxial kneader were 46.7 parts by weight of the modified polyamide resin prepared in the above manner, 34.6 parts by weight of the ethylene-vinyl alcohol copolymer and 100.0 parts by weight of the maleic anhydride-modified ethylene-propylene copolymer or epoxy-modified ethylene-methyl acrylate copolymer, which were melt-blended at a kneader temperature of 230° C. Once the maleic anhydride-modified ethylene-propylene copolymer or epoxy-modified ethylene-methyl acrylate copolymer was dispersed, 2,2'-diaminodiphenyl disulfide and/or 3,3'-diaminodiphenyl sulfone was/were fed at an amount shown in Tables 4 to 6 and melt-blended. The thus melt-blended mixtures were then extruded from the extruder in the form of a strand, which were cooled with water and cut by a cutter to obtain thermoplastic elastomer compositions in the form of a pellet.

(3) Method of Evaluating the Thermoplastic Elastomer Compositions

For the obtained thermoplastic elastomer compositions, the melt viscosity, extrusion load and low-temperature durability were evaluated by the following method.

[Melt Viscosity]

Melt viscosity refers to melt viscosity of a component at an arbitrary temperature during kneading processing. The melt viscosity of each polymer material is dependent on temperature, shear rate and shear stress; therefore, the stress and shear rate of the polymer material are measured normally at an arbitrary temperature at which the polymer material is in a melted condition to flow in a capillary, particularly at the temperature range during kneading, to determine the melt viscosity by the following equation:

$$\eta = \text{shear stress}/\text{shear rate}$$

In the present invention, a capillary rheometer, Capilograph 1C manufactured by Toyo Seiki Seisaku-sho, Ltd., was used to measure the melt viscosity (Pa·s) of the thermoplastic elastomer compositions at 250° C. and a shear rate of 250 $sec^{-1}$. From the standpoint of the film moldability, the melt viscosity is preferably not higher than 1,800 Pa·s. For Comparative Examples 1 and 2 and Examples 1 to 12, the values are indicated in terms of an index with the melt viscosity of Comparative Example 1 being 100. For Comparative Examples 3 to 7 and Examples 13 to 24, the values are indicated in terms of an index with the melt viscosity of Comparative Example 3 being 100.

[Extrusion Load]

When the thermoplastic elastomer compositions in the form of a pellet were extruded using a 40 mmϕ extruder equipped with a 200 mm wide T-die, manufactured by Pla Giken Co., Ltd., under a constant condition in which the temperature was set at 20° C. higher than the melting point of the thermoplastic elastomer, the extrusion load was measured by a resin pressure sensor at the tip of the extruder. For Comparative Examples 1 and 2 and Examples 1 to 12, the values are indicated in terms of an index with the resin pressure of Comparative Example 1 being 100. For Comparative Examples 3 to 7 and Examples 13 to 24, the values are indicated in terms of an index with the resin pressure of Comparative Example 3 being 100.

[Low-Temperature Durability]

Using a 40 mmϕ extruder equipped with a 200 mm wide T-die manufactured by Pla Giken Co., Ltd., the thermoplastic elastomer compositions in the form of a pellet were extruded under a constant temperature of 20° C. higher than the melting point of the thermoplastic elastomer and molded into sheets having an average thickness of 1 mm. Next, the thus obtained sheets were cut by JIS #3 dumbbell and subjected to 40% repeated deformation at −35° C. The measurement of breaking was carried out five times to calculate an average value of the number of breakings, which was designated as the average number of breakings. The average numbers of breakings of Comparative Examples 1 and 2 and Examples 1 to 12 are indicated in terms of an index with that of Comparative Example 1 being 100. The average numbers of breakings of Comparative Examples 3 to 7 and Examples 13 to 24 are indicated in terms of an index with that of Comparative Example 3 being 100. The larger the index, the superior the low-temperature durability.

(4) Results of the Evaluation of the Thermoplastic Elastomer Compositions

The evaluation results are shown in Tables 2 to 6.

TABLE 2

| | | Comparative Example 1 | Example 1 | Example 2 | Example 3 | Example 4 | Example 5 | Example 6 |
|---|---|---|---|---|---|---|---|---|
| Modified polyamide resin | [parts by weight] | 81.3 | 81.3 | 81.3 | 81.3 | 81.3 | 81.3 | 81.3 |
| Ethylene-vinyl alcohol copolymer | [parts by weight] | 0 | 0 | 0 | 0 | 0 | 0 | 0 |
| Maleic anhydride-modified ethylene-propylene copolymer | [parts by weight] | 100.0 | 100.0 | 100.0 | 100.0 | 100.0 | 100.0 | 100.0 |
| 2,2'-diaminodiphenyl disulfide | [parts by weight] | 0 | 0.5 | 1.0 | 1.5 | 0.35 | 0.7 | 1.4 |
| 3,3'-diaminodiphenyl sulfone | [parts by weight] | 0 | 0 | 0 | 0 | 0.25 | 0.5 | 1.0 |
| Total | [parts by weight] | 181.3 | 181.8 | 182.3 | 182.8 | 181.9 | 182.5 | 183.7 |
| Amount of compound (B) based on 100 parts by weight of polyamide resin (A) | [parts by weight] | 2 | 2 | 2 | 2 | 2 | 2 | 2 |
| Amount of modified rubber (D) based on 100 parts by weight of modified polyamide resin (C) | [parts by weight] | 135.1 | 135.1 | 135.1 | 135.1 | 135.1 | 135.1 | 135.1 |
| Melt viscosity | (Comparative Example 1 = 100) | 100 | 90 | 85 | 82 | 95 | 92 | 91 |
| Extrusion load | (Comparative Example 1 = 100) | 100 | 90 | 85 | 82 | 95 | 92 | 91 |
| Low-temperature durability | (Comparative Example 1 = 100) | 100 | 100 | 100 | 100 | 175 | 200 | 250 |

TABLE 3

| | | Comparative Example 2 | Example 7 | Example 8 | Example 9 | Example 10 | Example 11 | Example 12 |
|---|---|---|---|---|---|---|---|---|
| Modified polyamide resin | [parts by weight] | 81.3 | 81.3 | 81.3 | 81.3 | 81.3 | 81.3 | 81.3 |
| Ethylene-vinyl alcohol copolymer | [parts by weight] | 0 | 0 | 0 | 0 | 0 | 0 | 0 |
| Epoxy-modified ethylene-methyl acrylate copolymer | [parts by weight] | 100.0 | 100.0 | 100.0 | 100.0 | 100.0 | 100.0 | 100.0 |
| 2,2'-diaminodiphenyl disulfide | [parts by weight] | 0 | 0.5 | 1.0 | 1.5 | 0.35 | 0.7 | 1.4 |
| 3,3'-diaminodiphenyl sulfone | [parts by weight] | 0 | 0 | 0 | 0 | 0.25 | 0.5 | 1.0 |
| Total | [parts by weight] | 181.3 | 181.8 | 182.3 | 182.8 | 181.9 | 182.5 | 183.7 |
| Amount of compound (B) based on 100 parts by weight of polyamide resin (A) | [parts by weight] | 2 | 2 | 2 | 2 | 2 | 2 | 2 |
| Amount of modified rubber (D) based on 100 parts by weight of modified polyamide resin (C) | [parts by weight] | 135.1 | 135.1 | 135.1 | 135.1 | 135.1 | 135.1 | 135.1 |
| Melt viscosity | (Comparative Example 1 = 100) | 100 | 90 | 85 | 82 | 95 | 92 | 91 |
| Extrusion load | (Comparative Example 1 = 100) | 100 | 90 | 85 | 82 | 95 | 92 | 91 |
| Low-temperature durability | (Comparative Example 1 = 100) | 92 | 92 | 92 | 92 | 161 | 184 | 230 |

TABLE 4

| | | Comparative Example 3 | Example 13 | Example 14 | Example 15 | Example 16 | Example 17 | Example 18 |
|---|---|---|---|---|---|---|---|---|
| Modified polyamide resin | [parts by weight] | 46.7 | 46.7 | 46.7 | 46.7 | 46.7 | 46.7 | 46.7 |
| Ethylene-vinyl alcohol copolymer | [parts by weight] | 34.6 | 34.6 | 34.6 | 34.6 | 34.6 | 34.6 | 34.6 |
| Maleic anhydride-modified ethylene-propylene copolymer | [parts by weight] | 100.0 | 100.0 | 100.0 | 100.0 | 100.0 | 100.0 | 100.0 |
| 2,2'-diaminodiphenyl disulfide | [parts by weight] | 0 | 0.5 | 1.0 | 1.5 | 0.35 | 0.7 | 1.4 |
| 3,3'-diaminodiphenyl sulfone | [parts by weight] | 0 | 0 | 0 | 0 | 0.25 | 0.5 | 1.0 |
| Total | [parts by weight] | 181.3 | 181.8 | 182.3 | 182.8 | 181.9 | 182.5 | 183.7 |

TABLE 4-continued

| | | Comparative Example 3 | Example 13 | Example 14 | Example 15 | Example 16 | Example 17 | Example 18 |
|---|---|---|---|---|---|---|---|---|
| Amount of compound (B) based on 100 parts by weight of polyamide resin (A) | [parts by weight] | 2 | 2 | 2 | 2 | 2 | 2 | 2 |
| Amount of modified rubber (D) based on 100 parts by weight of total amount of modified polyamide resin (C) and ethylene-vinyl alcohol copolymer | [parts by weight] | 129.7 | 129.7 | 129.7 | 129.7 | 129.7 | 129.7 | 129.7 |
| Melt viscosity | (Comparative Example 3 = 100) | 100 | 91 | 84 | 82 | 95 | 92 | 91 |
| Extrusion load | (Comparative Example 3 = 100) | 100 | 91 | 84 | 82 | 95 | 92 | 91 |
| Low-temperature durability | (Comparative Example 3 = 100) | 100 | 100 | 100 | 100 | 175 | 200 | 250 |

TABLE 5

| | | Comparative Example 4 | Example 19 | Example 20 | Example 21 | Example 22 | Example 23 | Example 24 |
|---|---|---|---|---|---|---|---|---|
| Modified polyamide resin | [parts by weight] | 46.7 | 46.7 | 46.7 | 46.7 | 46.7 | 46.7 | 46.7 |
| Ethylene-vinyl alcohol copolymer | [parts by weight] | 34.6 | 34.6 | 34.6 | 34.6 | 34.6 | 34.6 | 34.6 |
| Epoxy-modified ethylene-methyl acrylate copolymer | [parts by weight] | 100.0 | 100.0 | 100.0 | 100.0 | 100.0 | 100.0 | 100.0 |
| 2,2'-diaminodiphenyl disulfide | [parts by weight] | 0 | 0.5 | 1.0 | 1.5 | 0.35 | 0.7 | 1.4 |
| 3,3'-diaminodiphenyl sulfone | [parts by weight] | 0 | 0 | 0 | 0 | 0.25 | 0.5 | 1.0 |
| Total | [parts by weight] | 181.3 | 181.8 | 182.3 | 182.8 | 181.9 | 182.5 | 183.7 |
| Amount of compound (B) based on 100 parts by weight of polyamide resin (A) | [parts by weight] | 2 | 2 | 2 | 2 | 2 | 2 | 2 |
| Amount of modified rubber (D) based on 100 parts by weight of total amount of modified polyamide resin (C) and ethylene-vinyl alcohol copolymer | [parts by weight] | 129.7 | 129.7 | 129.7 | 129.7 | 129.7 | 129.7 | 129.7 |
| Melt viscosity | (Comparative Example 3 = 100) | 100 | 91 | 84 | 82 | 95 | 92 | 91 |
| Extrusion load | (Comparative Example 3 = 100) | 100 | 91 | 84 | 82 | 95 | 92 | 91 |
| Low-temperature durability | (Comparative Example 3 = 100) | 90 | 90 | 90 | 90 | 157.5 | 180 | 225 |

TABLE 6

| | | Comparative Example 5 | Comparative Example 6 | Comparative Example 7 |
|---|---|---|---|---|
| Modified polyamide resin | [parts by weight] | 46.7 | 46.7 | 46.7 |
| Ethylene-vinyl alcohol copolymer | [parts by weight] | 34.6 | 34.6 | 34.6 |
| Maleic anhydride-modified ethylene-propylene copolymer | [parts by weight] | 100.0 | 100.0 | 100.0 |
| 2,2'-diaminodiphenyl disulfide | [parts by weight] | 0 | 0 | 0 |
| 3,3'-diaminodiphenyl sulfone | [parts by weight] | 0.5 | 1.0 | 2.0 |
| Total | [parts by weight] | 181.8 | 182.3 | 183.3 |
| Amount of compound (B) based on 100 parts by weight of polyamide resin (A) | [parts by weight] | 2 | 2 | 2 |
| Amount of modified rubber (D) based on 100 parts by weight of total amount of modified polyamide resin (C) and ethylene-vinyl alcohol copolymer | [parts by weight] | 129.7 | 129.7 | 129.7 |
| Melt viscosity | (Comparative Example 3 = 100) | 110 | 115 | 120 |
| Extrusion load | (Comparative Example 3 = 100) | 110 | 115 | 120 |
| Low-temperature durability | (Comparative Example 3 = 100) | 200 | 250 | 350 |

In Comparative Examples 1 and 2, the modified rubber (D) was not dynamically cross-linked.

In Examples 1 to 3 and 7 to 9, the modified rubber (D) was dynamically cross-linked by the compound (F) having at least one disulfide bond and at least two amino groups. It can be seen that the extrusion load was reduced compared to Comparative Example 1.

In Examples 4 to 6 and 10 to 12, the modified rubber (D) was dynamically cross-linked by the compound (F) having at least one disulfide bond and at least two amino groups, as well as by the compound (G) having at least two amino groups and having no disulfide bond. It can be seen that, compared to Comparative Example 1, the low-temperature durability was improved while reducing the extrusion load.

Comparative Examples 3 and 4 and Example 13 to 24 are examples in which a part of the modified polyamide resin was substituted by ethylene-vinyl alcohol copolymer. It can be seen that the same effects as in the above were attained also when ethylene-vinyl alcohol copolymer was contained.

In Comparative Examples 5 to 7, the compound (F) having at least one disulfide bond and at least two amino groups was not added and the modified rubber (D) was dynamically cross-linked only by the compound (G) having at least two amino groups and having no disulfide bond. In this case, it can be seen that the extrusion load was increased although the low-temperature durability was improved.

INDUSTRIAL APPLICABILITY

The thermoplastic elastomer composition of the present invention can be used in the production of a tire, particularly a pneumatic tire. Especially, the thermoplastic elastomer composition of the present invention can be suitably used in the production of an inner liner of a pneumatic tire. In addition, the thermoplastic elastomer composition of the present invention can be used in applications in which gas-barrier properties are demanded, such as a hose.

The invention claimed is:

1. A thermoplastic elastomer composition comprising a modified polyamide resin (C) and a modified rubber (D) dispersed in the modified polyamide resin (C), the modified polyamide resin (C) being a resin obtained by melt-blending a polyamide resin (A) and a compound (B) capable of reacting with a terminal amino group of a polyamide resin, wherein the modified rubber (D) has an acid anhydride group or epoxy group and is dynamically cross-linked by a compound (F) having at least one disulfide bond and at least two amino groups; wherein the modified rubber (D) is dynamically cross-linked by the compound (F) having at least one disulfide bond and at least two amino groups and a compound (G) having at least two amino groups and having no disulfide bond.

2. A thermoplastic elastomer composition according to claim 1, wherein the compound (B) capable of reacting with a terminal amino group of a polyamide resin is a monofunctional epoxy compound.

3. A thermoplastic elastomer composition according to claim 1, wherein the polyamide resin (A) is nylon 6 or nylon 666.

4. A thermoplastic elastomer composition according to claim 1, wherein a rubber constituting the modified rubber (D) is an ethylene-α-olefin copolymer, or an ethylene-unsaturated carboxylic acid copolymer or a derivative thereof.

5. A thermoplastic elastomer composition according to claim 1, wherein the compound (F) having at least one disulfide bond and at least two amino groups is diaminodiphenyl disulfide.

6. A thermoplastic elastomer composition according to claim 1, wherein the compound (G) having at least two amino groups and having no disulfide bond is 3,3'-diaminodiphenyl sulfone.

7. A thermoplastic elastomer composition according to claim 1, comprising 90 to 180 parts by weight of the modified rubber (D) based on 100 parts by weight of the modified polyamide resin (C).

8. A thermoplastic elastomer composition according to claim 1, comprising 0.01 to 5 parts by weight of the compound (F) having at least one disulfide bond and at least two amino groups based on 100 parts by weight of the modified rubber (D).

9. A thermoplastic elastomer composition according to claim 1, wherein the total amount of the compound (F) having at least one disulfide bond and at least two amino groups and the compound (G) having at least two amino groups and having no disulfide bond is 0.01 to 5 parts by weight based on 100 parts by weight of the modified rubber (D).

10. A thermoplastic elastomer composition according to claim 1, wherein the modified polyamide resin (C) is a resin obtained by melt-blending 100 parts by weight of the polyamide resin (A) and 0.05 to 5 parts by weight of the compound (B) capable of reacting with a terminal amino group of a polyamide resin.

11. A thermoplastic elastomer composition according to claim 1, which further comprises an ethylene-vinyl alcohol copolymer (H).

12. A thermoplastic elastomer composition according to claim 11, wherein the weight ratio of the modified polyamide resin (C) to the ethylene-vinyl alcohol copolymer (H) is 90/10 to 10/90 and the amount of the modified rubber (D) is 90 to 180 parts by weight based on 100 parts by weight of the total amount of the modified polyamide resin (C) and the ethylene-vinyl alcohol copolymer (H).

13. A pneumatic tire comprising a film composed of a thermoplastic elastomer composition according to claim 1 as an inner liner.

* * * * *